(12) United States Patent
Kitagawa

(10) Patent No.: US 6,339,418 B1
(45) Date of Patent: Jan. 15, 2002

(54) SURFACE ILLUMINANT DEVICE AND FLAT-PANEL DISPLAY USING THE SAME

(75) Inventor: Masakazu Kitagawa, Tokyo (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/438,378

(22) Filed: Nov. 12, 1999

(30) Foreign Application Priority Data

Nov. 13, 1998 (JP) .......................................... 10-323927

(51) Int. Cl.[7] .................................................. G09G 3/36
(52) U.S. Cl. .......................................... 345/102; 349/65
(58) Field of Search ................................ 345/102, 101, 345/87, 73, 75, 77, 38; 349/65, 69, 62, 67, 58

(56) References Cited

U.S. PATENT DOCUMENTS 5,815,227 A  * 9/1998  Lee .............................. 349/67
5,831,697 A  * 11/1998  Evanicky ..................... 349/62
6,064,455 A  * 5/2000  Kim ............................. 349/65
6,108,060 A  * 8/2000  Funamoto et al. ............ 349/65

* cited by examiner

Primary Examiner—Chanh Nguyen
(74) Attorney, Agent, or Firm—Pillsbury Winthrop LLP

(57) ABSTRACT

In a side-light type surface illuminant device, or a flat-panel display device using the same, a light guide plate 1 has a groove-like or notch-like receiving portion 11 for receiving the pull-around line 21, that is, a wiring that supplies electricity to a tubular light source (or lamp) 22 from a power socket 24 of a lamp unit 2. The receiving portion 11 for receiving the pull-around line 21 is disposed an the lower face (rear-side) of the light guide plate 1 along one side-end face 1a of the light guide plate 1 at which the tubular light source 22 is not disposed.

13 Claims, 6 Drawing Sheets

110

120

SURFACE ILLUMINANT DEVICE AND FLAT-PANEL DISPLAY USING THE SAME

BACKGROUND OF THE INVENTION

This invention relates to a surface illuminant device of side-light type and a flat-panel display device using this surface illuminant device.

Flat-panel display devices such as liquid crystal display devices have been used as image display devices for television set, various computers, car navigation system and the like because of their features that they are thin and light-weighted and consume a small electric power.

For example, a liquid crystal display device of light transmission type includes a liquid crystal panel, constituted by a pair of transparent substrates and a liquid crystal layer between the substrates, and a surface illuminant device disposed on a rear surface (a surface opposite to an image display surface) of this liquid crystal panel for providing illuminant light to this liquid crystal panel.

To make this type of flat-panel display device thin and compact, it is necessary to make the surface illuminant device thin. In view of the above, the main stream of the surface illuminant devices (backlights) has been shifting from direct backlight to the side-light type back light (edge-light type surface illuminant device).

As disclosed in JP-U-63024529 (Japanese Utility Model publication, unexamined 63-24529(1988)), the edge-light type surface illuminant device includes a tubular light source, and a light guide plate formed of a thin plate or an acrylic resin or the like and having a milky white scattering pattern printed on its rear surface. One end face of the light guide plate is disposed close to the tubular light source. Accordingly, the illuminant light emitted from the tubular light source is propagated in the light guide plate and is scattered by the scattering pattern on its rear surface, so as to be emitted from liquid-crystal-panel-side rain surface of the light guide plate.

The tubular light source is arranged along one to three edges (or side-end faces) of the rectangular light guide plate and has both ends thereof respectively connected with power wirings. These two power wirings are usually arranged in one power socket, which is disposed in the vicinity of one end of the tubular light source. In this way, the tubular light source is replaceable together with this power wirings and the power socket. The two power wirings from this power socket to the tubular light source usually consists of a short wiring which is connected to one end of the tubular light source and a long wiring which is connected to the other end of the tubular light source. These wirings are called harness in general.

In case the tubular light source is disposed along two or three edges (or side-end faces) of the light guide plate, in particular, in case the tubular light source is disposed in an approximately U-shape along three edges, the long power wiring is extended or pulled around from one side to the other side of the light guide plate along the edge of the light guide plate where the tubular light source is not disposed. In this specification, the portion of the power wiring for the tubular light source, which extends along the edge region where the tubular light source is not disposed, is called a pull-around line hereinafter.

In FIG. 8 and FIG. 9, the arrangement of the pull-around line in the conventional surface illuminant device 110, 120 is schematically shown.

In FIG. 8, a pull-around line 121 which connects a tubular light source 122 and a power socket 124 is disposed in such a manner that the pull-around line 121 creeps along a aide-end face of a light guide plate 101.

In FIG. 9, the pull-around line 121 is disposed in such a manner that the pull-around line 121 creeps on a lower face of a lower-side frame 104 rear-face side frame of the surface illuminant device 120).

As shown in FIG. 8, in case the pull-around line 121 is disposed at the outside of the side-end face of the light guide plate 101, the area of non-light-emitting region on the peripheral portion of the surface illuminant device 110 is increased corresponding to such an arrangement. Accordingly, when the surface illuminant device 110 is assembled into a flat-panel display device, the width of a non-image-display region (picture-frame region) at the peripheral portion of the flat-panel display device becomes wide.

As shown in FIG. 9, in case the pull-around line 121 is disposed on the lower side of the lower-side frame, the thickness of the surface illuminant device 120 and the thickness of a flat-panel display device into which the surface illuminant device 120 is assembled become large.

In particular, with respect to portable flat-panel display devices, there has been a case that even a potential plan on new products is difficult to be adopted without achieving a further progress in making the devices compact and thin.

BRIEF SUMMARY OF THE INVENTION

In view of the above drawbacks, it is an object of the present invention to provide a surface illuminant device and a flat-panel display device which can achieve a further miniaturization and thinning.

In a surface illuminant device of the present invention which includes; a tubular light source having both ends thereof respectively connected with power wirings; and a light guide plate being arranged in such a manner that side-end faces thereof are disposed close to the tubular light source and an incident light from the tubular light source through the side-end faces is propagated in the light guide plate and is emitted from an upper face of the light guide plate; wherein side-end faces or edges of whole periphery of the light guide plate consists of side-end face(s) or edge(s) at which the tubular light source is disposed closely and the other side-end facet(s) or edge (s) at which the tubular light source is not disposed; and at least one of the power wirings includes a pull-around line which extends along the other side-end face(s) or edge(s) at which the tubular light source is not disposed; further comprising a groove-like or notch-like receiving portion, which extends continuously along the side-end face(s) or edge(s) at which the light source is not disposed, is formed in the light guide plate; and the pull-around line is at least partially accommodated in the receiving portion.

Due to such a construction, the surface illuminant device can be made compact and thin. Furthermore, it gives rise substantially no increase of the manufacturing cost.

According to one preferred embodiment, the receiving portion has the sufficient depth and the width to accommodate the pull-around line.

Due to such a construction, the pull-around line can be accommodated within an original contour of the light guide plate. Moreover, the manufacturing of the device is facilitated.

According to another preferred embodiment, the pull-around line is fitted into the receiving portion.

In one particular preferred embodiment, the depth and the width of the receiving portion are set smaller than the corresponding sizes or the pull-around line so that the pull-around line is protruded downwardly thus forming a downward protrusion, and a slit which receives such a protrusion is formed in a cover which covers the lower face of the light guide plate, and the protrusion is inserted in this slit in such a manner that the protrusion hermetically seals the slit.

Due to such a construction, by reducing the depth of receiving portion, the influence given to the light guide plate by forming the receiving portion can be minimized while the increase of the size of the contour can be minimized.

According to another preferred embodiment, a light reflector member is interposed between the pull-around line and the light guide plate.

According to still another preferred embodiment, a sheath of the pull-around line is white.

Due to such a construction, even when neither a reflector sheet nor a reflector film coating is provided to the receiving portion of the light guide plate, the performance of the light guide plate is not deteriorated.

DETAILED DESCRIPTION OF THE INVENTION

The present invention is hereinafter explained in view of intermediate or small type liquid crystal display device using a surface illuminant device. In particular, the present invention is explained by exemplifying a case where the surface illuminant device is of "a backlight unit" in which one frame box accommodates a light guide plate, a tubular light source and films such as a reflector sheet.

Figure 1:
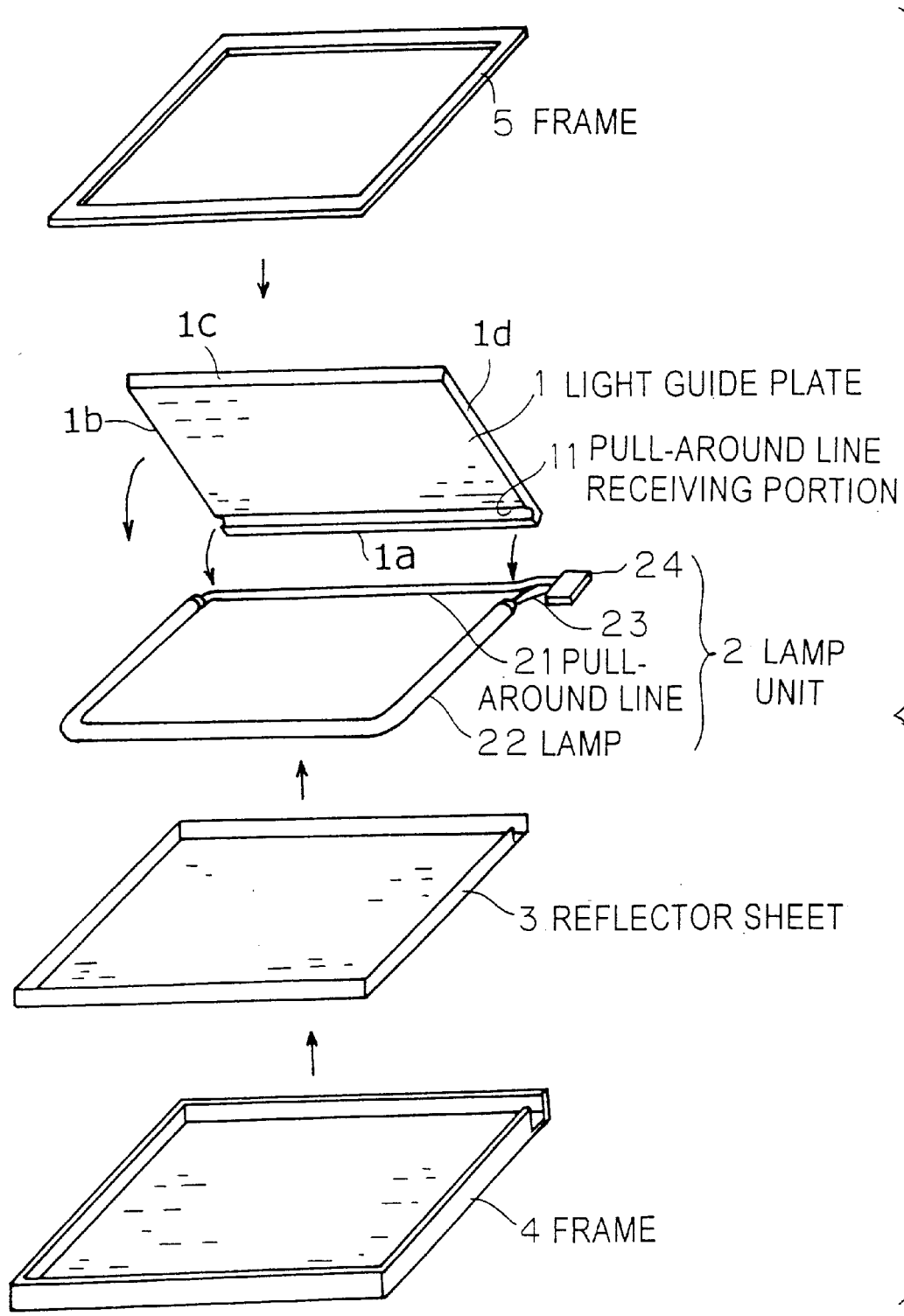
FIG. 1 is schematic exploded perspective view showing an assembling of a surface illuminant device of the first embodiment.
Figure 2:
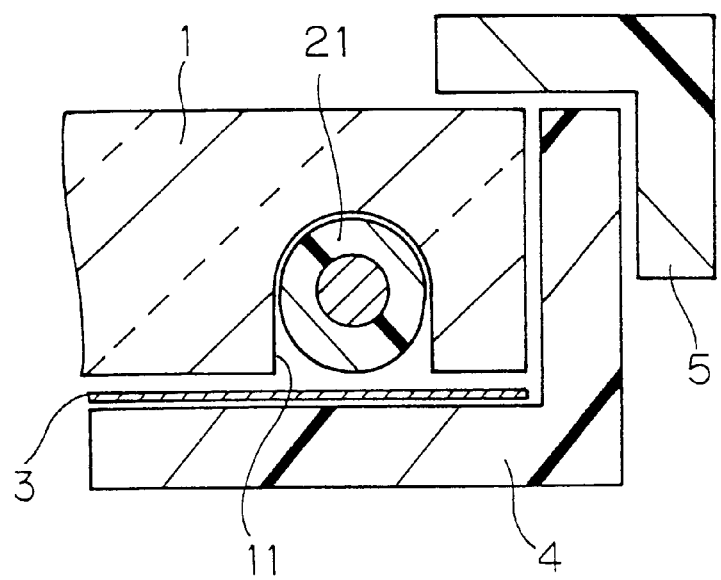
FIG. 2 is a vertical cross-sectional view of an essential part of the surface illuminant device of the first embodiment.

First of all, the first embodiment of the present invention is explained in conjunction with FIG. 1 and FIG. 2.

A surface illuminant device 10 is constructed such that an approximately rectangular light guide plate 1 formed of a transparent acrylic resin and a lamp unit 2 which is disposed at a periphery thereof are sandwiched between a lower frame 4, which also works as a cover of a rear surface side, and a picture-frame-like upper frame 5, through a reflector sheet 3 or the like. Here, 'upper' means the light-emitting side or the liquid-crystal-panel side.

The lamp unit 2 includes a tubular light source 22, power wirings 21, 23 that are respectively connected with both ends of the tubular light source 22, and a power socket 24 which fastens together these power wirings 21, 23 in the vicinity of one end of the tubular light source 22. The tubular light source 22 is formed in an approximately V-shape and is disposed along three edges or side-end faces 1b, 1c, 1d of the light guide plate 1, and not along one length-wise side-end face 1a of the light guide plate 1, in such a manner that the tubular light source 22 is disposed close to these three side-end faces 1b, 1c, 1d. Of these two power wirings 21, 23, the longer wiring constitutes a pull-around line 21 which extends along the length-wise side-end face 1a along which the tubular light source 22 is not disposed.

As shown in FIG. 1 and FIG. 2, a groove having an approximately inverted U-shaped cross section is formed on a lower face of the light guide plate 1 and this groove constitutes a receiving portion 11 that receives the pull-around line 21. The receiving portion 11 is a groove extending linearly and is disposed parallel to and close to the length-wise side-end face 1a, along which the tubular light source 22 is not disposed.

As shown in FIG. 2, the cross section of the upper half portion (the curved wall portion) of the receiving portion 11 is formed in a round shape so as to make the upper half portion of the pull-around line 21 fitted into upper half portion of the receiving portion 11. Furthermore, the sizes of the receiving portion 11 in a vertical direction and a horizontal direction, that is, the depth and width of the groove are approximately equal to the diameter of the pull-around line 21. Accordingly, the pull-around line 21 can be accommodated in the original contour of the light guide plate 1, that is, the contour of the light guide plate 1 that has no receiving portion 11. Furthermore, when the surface illuminant device 10 is assembled, the pull-around line 21 has the upper portion thereof brought into close contact with the inner wall of the receiving portion 11 due to a pressing force from the lower frame 4.

In the embodiment, although the receiving portion 11 is partially positioned within an effective light-emitting region (light-emitting area) of the light guide plate 1, the sheath of the pull-around line 21 is white so that the pull-around line 21 can diffusingly reflect the light from the light guide plate 1. Hence, the light, which propagates in the light guide plate 1 substantially, suffers from no loss and no luminescent line occurs. In this embodiment, the light-emitting area of the light guide plate 1 is a region not less than 1 mm inside from the side-end faces of the light guide plate 1.

Furthermore, as shown in FIG. 2, since the pull-around line 21 is disposed along and close to the side-end face 1a of the light guide plate 1 where the tubular light source 22 is not disposed and also is disposed on the lower face of the light guide plate 1, no adverse influence is substantially given to the performance of the light guide plate 1 in terms of the propagation of light or the irradiation of light from the upper face of the light guide plate 1.

Furthermore, the light guide plate 1 is integrally formed by molding and hence, the receiving portion 11 can be formed by merely add a partial change to a mold and it is unnecessary to add manufacturing steps or a manufacturing cost.

As a specific example of sizes, the thickness of the light guide plate 1 is 2.6–3.0 mm, the diameter of the tubular light source 22 is 2.4 cm, the thickness of the reflector sheet 3 is 0.2 mm, and the thickness of the lower frame 4 is 0.8–1.0 mm.

The other constitutions of this embodiment are hereinafter explained in detail.

The tubular light source 22 of the embodiment is made of a fluorescent tube such as a cold cathode tube and uses a high frequency alternating current as a power source. The tubular light source 22 is connected with the power wirings 21, 23 by soldering or caulking. The sheaths of the wirings 21, 23 are generally made of silicone-based resin, polyethylene resin or the like and hence, it is easy to give them a high whiteness (light reflectance). Furthermore, the sheaths having proper structure and composition are preferably selected so as to prevent yellowing thereof by deterioration. If necessary, a white paint may be coated on the outer surface on the sheaths, or in otherwise the sheaths nay be covered with tubes of fluorine-based resin.

The reflector sheet 3 is provided for preventing the light front leaking from the light guide plate 1 to the rear side thereof thus effectively making use of the light from the tubular light source 22. In this embodiment, the reflector sheet 3 is bent along three side-end faces 1b, 1c, and 1d of the light guide plate 1 so as to cover the U-shaped tubular light source 22 from its lower side (rear-face aside of the light guide plate 1), its outer peripheral side and its upper side. That is, the reflector sheet 3 also works as a mirror for the lamp. The reflector sheet 3 is formed of a following three-layered laminated film, for example. That is, an insulation reflector film made of polycarbonate film, a conductive film made of aluminum (Al) and an insulation film made of polyethylene terephthalate (PET) are laminated in this order from the light guide plate 1 side.

The frames 4, 5 are integrally but respectively formed by resin and are jointed to each other by means of an engagement of pawls or screws.

On the upper face of the light guide plate 1, a diffusion sheet, which is slightly larger than light-emitting area or the surface illuminant device, and a lens sheet, which gives directivity to the emitting light, are disposed although they are omitted from the drawing.

A liquid crystal display device which uses the above-mentioned surface illuminant device 10 is constructed in the same manner as disclosed in Japanese patent application No. 10-240506(1998), for example.

The liquid crystal display device is capable of a color picture/text representation and has a viewing area of a 7-inch diagonal size and a wide-type aspect ratio of 16:9. On the surface illuminant device 10, a liquid crystal panel is mounted and this panel is covered with a metallic bezel cover having a picture-frame shape. On the lower face of the surface illuminant device 10, for example, a drive circuit board (PCB) is disposed while the drive circuit board and the liquid crystal panel are connected with each other by a flexible circuit board TCP. The liquid crystal panel is a TN-TFT type. That is, twisted nematic type liquid crystal material is used while thin film transistors are used as switching elements for effecting an active matrix driving on each pixel.

Figure 3:
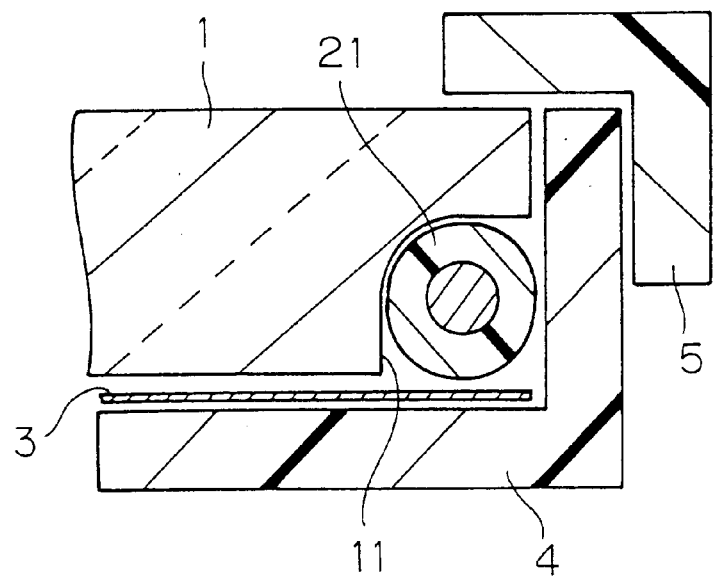
FIG. 3 is a vertical cross-sectional view of an essential part of the surface illuminant device of the second embodiment.

The second embodiment is hereinafter explained in conjunction with FIG. 3.

In a surface illuminant device 20 of the second embodiment which has the similar construction as that of the first embodiment, the receiving portion 11 which receives the pull-around line 21 is constituted by a notch or a cutout portion formed in the edge portion of the light guide plate 1.

That is, on a vertical cross section perpendicular to a side-end face 1a and the pull-around line 21 (a cross section shown in FIG. 3), the receiving portion 11 is formed of the notch which opens toward the lower face and toward the side-end face of the light guide plate 1.

In an example shown in the drawing, the wall surface of the receiving portion 11 has an inversely L-shaped cross-section with a rounded corner. That is, between a vertical wall portion, which is contiguous with the lower face of the light guide plate 1, and a horizontal wall portion which is contiguous with the side-end face, a curved wall portion is formed. The receiving portion 11 is formed such that the left upper portion (in the drawing) or the pull-around line 21 is fitted into this curved wall portion. Furthermore, the sizes of the receiving portion 11 in a vertical direction as well as in a horizontal direction at the cross section shown in drawings, that is, the depths of the receiving portion 11 from the lower face and the side-end face or the light guide plate 1 are respectively set approximately equal to or slightly smaller than the diameter of the pull-around line 21. The receiving portion 11 is partially positioned within the tight-emitting area of the light guide plate 1.

Accordingly, when a backlight unit is assembled, the pull-around line 21 is accommodated and sandwiched in the receiving portion 11 in such a manner that it is pressed by the frame 4 by way of the reflector sheet 3 from the right and lower directions in the drawing, while it is pressed by the inner wall of the receiving portion 11 from the left and upper directions in the drawing.

Accordingly, in this embodiment, the pull-around line 21 can also be accommodated within the original contour of the light guide plate 1 as in the case of the previous embodiment. Furthermore, the assembling is facilitated and it is unnecessary at all to add other members or other material or other steps.

Figure 4:
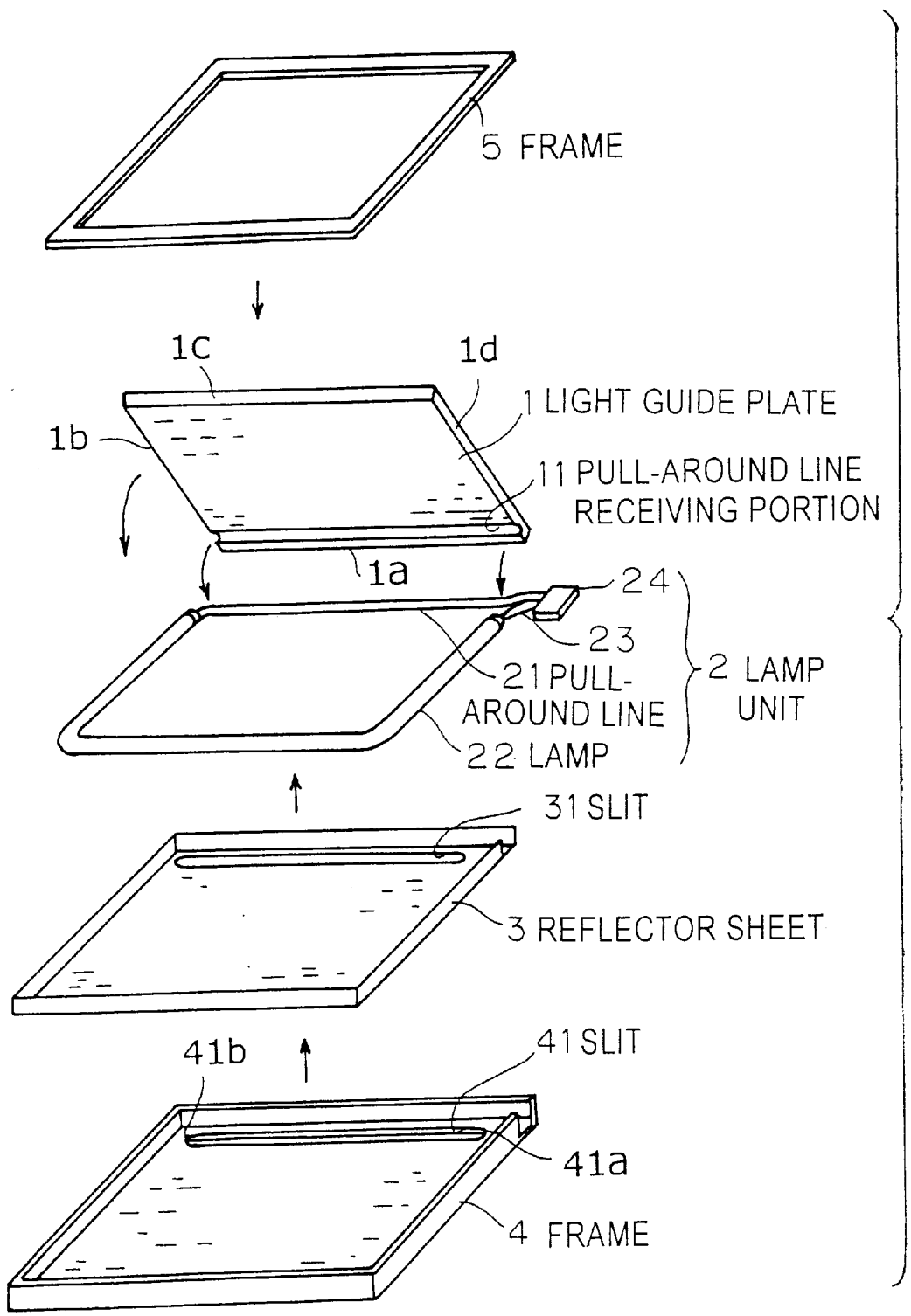
FIG. 4 is a schematic exploded perspective view showing an assembling of a surface illuminant device of the third embodiment.
Figure 5:
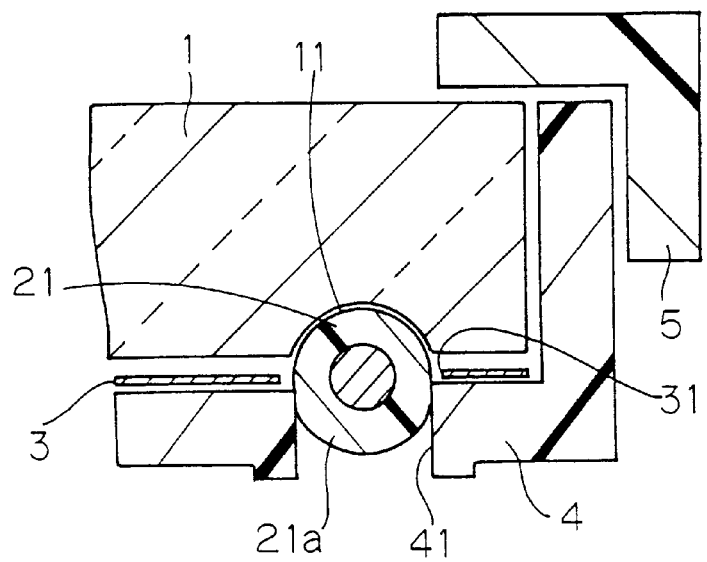
FIG. 5 is a vertical cross-sectional view of an essential part of the surface illuminant device of the third embodiment.

Then, the third embodiment is explained hereinafter in conjunction with FIG. 4 and FIG. 5.

In a surface illuminant device 30 of this embodiment which has a similar construction as the surface illuminant device 10 of the first embodiment, the depth of the groove-like receiving portion 11 is set at approximately the half of the diameter of the pull-around line 21. Accordingly, the pull-around line 21 which is inserted and fitted into the receiving portion 11 has its lower halt portion protruded downwardly from the lower face of the light guide plate 1 thus forming a protruding portion 21a. In a portion of the reflector sheet 3, which corresponds to the protruding portion 21a, a slit 31 having a width slightly wider than the diameter of the pull-around line 21 is formed such that the protruding portion 21a passes through the slit 31. Furthermore, also the lower frame 4 has a slit 41 at a portion corresponding to the protruding portion 21a.

The width of this slit 41 is set narrower than the width of the slit 31 of the reflector sheet 3, while it is set slightly narrower than the diameter of the pull-around line 21. Furthermore, the length of the alit 41 is slightly longer than the length of the groove-like receiving portion 11. Both end portions 41a, 41b of the slit 41 are slightly extended from both lengthwise ends of the receiving portion 11, that is, from short sides 1b, 1d of the light guide plate 1 and are roundly formed as shown in FIG. 4. Both ends 41a, 41b of this slit 41 are formed in such a manner that both lengthwise ends of the protruding portion 21a, at which the pull-around line 21 is about to protrude downwardly, are tightly fitted into the ends 41a, 41b of the slit 41.

Due to such a construction, after assembling the surface illuminant device 30, no gap is formed between the protrusion 21a and the slit 41 and hence, no leakage of light occurs.

In this manner even when the slits 31, 41 are formed, the protruding portion 21a of the pull-around line 21 is hermetically fitted into the slit 41 of the frame 4 so that no leakage of light occurs. Furthermore, in the illustrated embodiment, the pull-around line 21 substantially does not protrude from the lower face of the frame 4 so that it is almost unnecessary to increase the thickness of the surface illuminant device 30.

According to this embodiment, compared to the first and second embodiments, although it is necessary to form the slits 31, 41, the similar effect can be obtained by reducing the depth of the receiving portion 11 This embodiment is particularly advantageous in case the diameter or the pull-around line 21 is greater than the thickness of the light guide plate 1 or the like.

Figure 6:
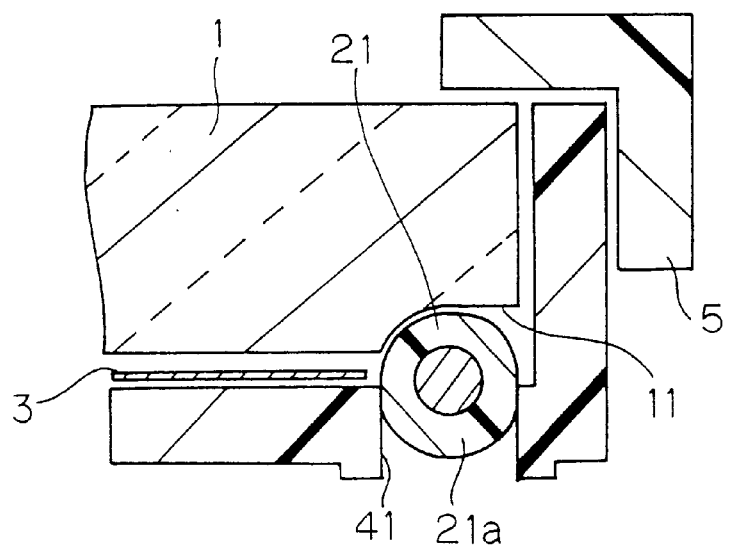
FIG. 6 is a vertical cross-sectional view of an essential part of the surface illuminant device of the fourth embodiment.

The fourth embodiment is hereinafter explained in conjunction with FIG. 6.

In a surface illuminant device 40 of the fourth embodiment having the similar construction as the surface illuminant device 20 of the second embodiment, the size in the vertical direction of the receiving portion 11 which receives the pull-around line 21 is set at approximately the half of the diameter of the pull-around line 21. The protruded portion 21a of the pull-around line 21 is also fitted into the slit 41 formed in the lower face portion of the frame 4 as in the case of the third embodiment thus hermetically closing the slit 41 so as to prevent the leakage of light.

Furthermore, a portion of the reflector sheet 3, which corresponds to the receiving portion 11 and the slit 41 and has a width slightly wider than the slit 41, is omitted. That is, a marginal portion of the reflector sheet 3 is omitted along the length-wise side-end face 1a of the light guide plate 1 where the tubular light source 22 is not disposed.

With this embodiment, effects similar to those of the third embodiment can be obtained.

With respect to the above-mentioned first to fourth embodiments, whereas the inner wall of the receiving portion 11 is formed in the approximately inverted U-shape having the vertical wall portion in cross-section or in the approximately inverted L-shape having the vertical wall portion and the horizontal wall portion in cross-section, the inner wall of the receiving portion 11 can be formed in other shape such as a funnel shape so as such a shape has a cross section made of a smooth line. In particular, in case the receiving portion 11 is the notch formed in the end portion of the light guide plate 1, the cross section of the inner wall may be made of approximately straight lines.

With, respect to the above-mentioned third and fourth embodiments, whereas the slit 41 is formed in the frame 4 to receive the downwardly protruding portion 21a of the pull-around line 21, a groove-like recess may be formed in place of the slit 41 when the thickness of the frame 4 is greater than the protruding size of the protruding portion 21a.

Figure 7:
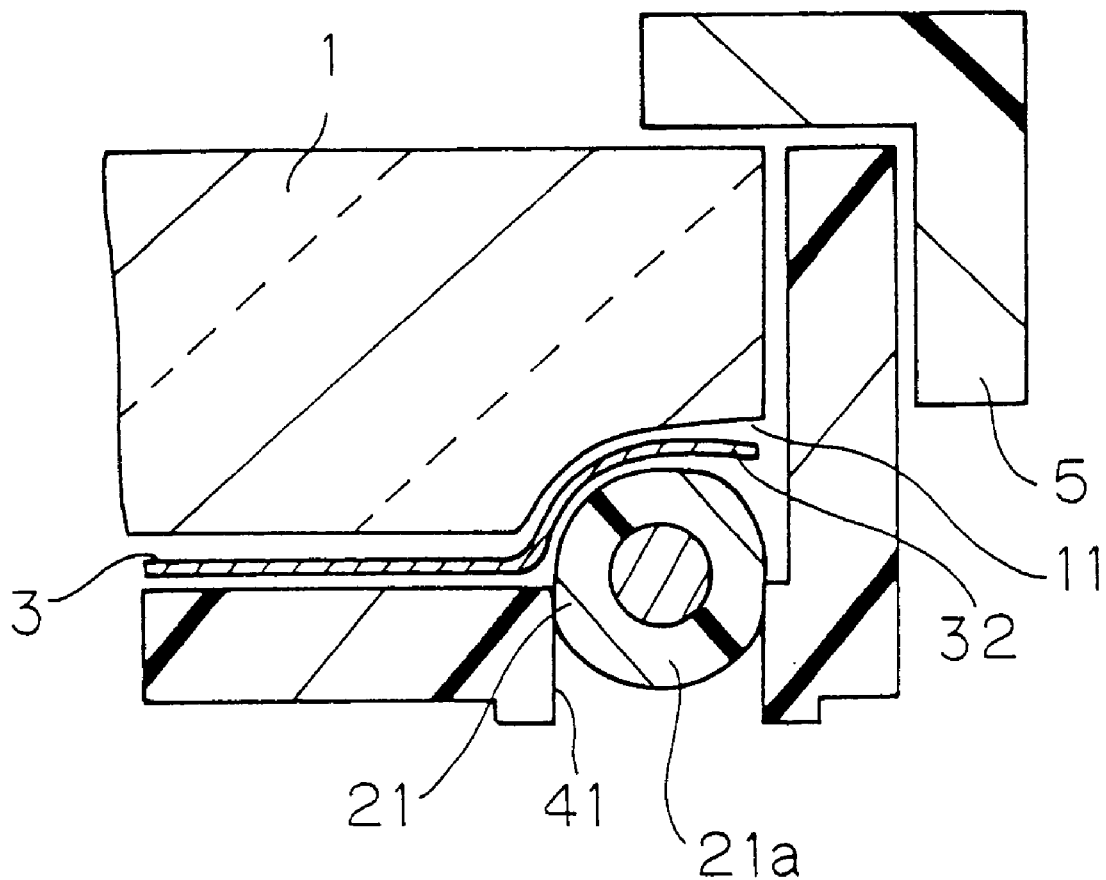
FIG. 7 is a vertical cross-sectional view of an essential part of the surface illuminant device of the fifth embodiment.
Figure 8:
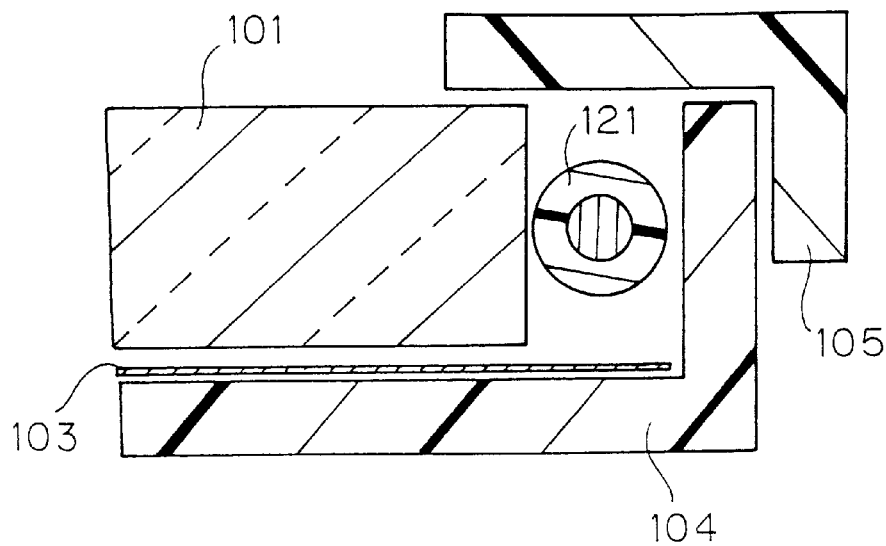
FIG. 8 is a partial vertical cross-sectional view of a conventional surface illuminant device showing an arrangement of a pull-around line.
Figure 9:
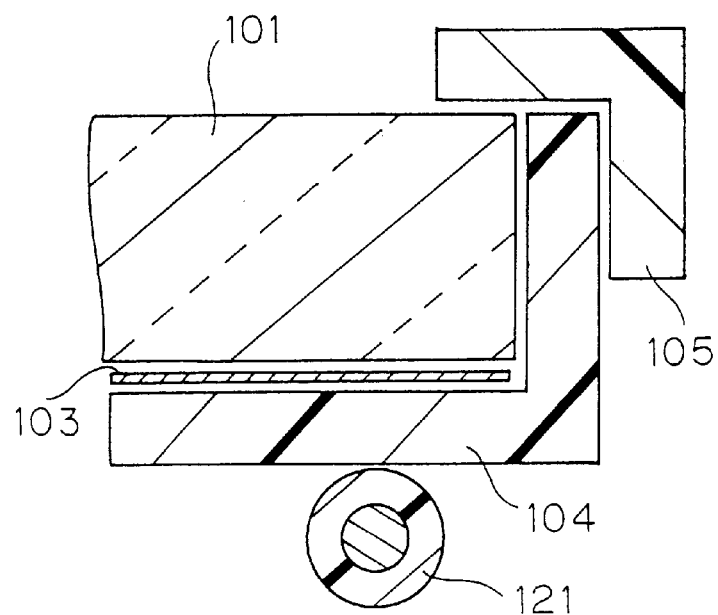
FIG. 9 is a partial vertical cross-sectional view or a conventional surface illuminant device showing another arrangement of the pull-around line.

Subsequently, the fifth embodiment is explained in conjunction with FIG. 7.

In a surface illuminant device 50 or the fifth embodiment having the similar constructionas that of the fourth embodiment, an extended portion 32 of the reflector sheet 3 covers the upper face of the pull-around line 21. That is, the light radiated from the inside of the light guide plate 1 through the inner wall surface of the receiving portion 11 is reflected by the extended portion 32 of the reflector sheet 3 and is returned to the inside of the light guide plate 1.

According to this embodiment, the sheath of the pull-around line 21 is not necessarily white and the sheath is prevented from the deterioration or the reflecting performance which is caused by yellowing even when material of the sheath is not properly selected.

What is claimed is:

1. A surface illuminant device comprising
   a tubular light source having both ends thereof respectively connected with power wirings,
   a light guide plate having a light-introducing side-end face or side-end faces along which said tubular light source is disposed closely so that an incident light from said tubular light source is propagated in said light guide plate and is emitted from an upper face or said light guide plate, and the other side-end face(s) or edge(s) along which said tubular light source is not disposed, and
   a pull-around line which extends along said other side-end face(s) or edge(s) and is included in one of said power wirings,
   further comprising a groove-like or notch-like receiving portion, formed in said light guide plate, which extends continuously along said other side-end face(s) or edge(s) and which at least partially accommodates said pull-around line.

2. A surface illuminant device according to claim 1, wherein said receiving portion is formed so as to open at a lower face of said light guide plate.

3. A surface illuminant device according to claim 1, wherein said receiving portion has the sufficient depth and the width to accommodate said pull-around line.

4. A surface illuminant device according to claim 1, wherein said pull-around line is fitted into said receiving portion.

5. A surface illuminant device according to claim 2,
   wherein the depth and the width of said receiving portion is set smaller than corresponding sizes of said pull-around line so that said pull-around line protrudes downwardly to form a protruding portion, and
   further comprising a slit which receives said protruding portion and is formed in a cover that covers a lower face of said light guide plate, said protruding portion being inserted and fitted into said slit so as to substantially hermetically close said slit.

6. A surface illuminant device according to claim 1, wherein a flat light reflecting member which returns a light emitted downwardly from the inside of said light guide plate to the inside of said light guide plate is disposed below said light guide plate.

7. A surface illuminant device according to claim 6, wherein said light reflecting member is disposed between said pull-around line and said light guide plate.

8. A surface illuminant device according to claim 6, wherein a sheath of said pull-around line is white.

9. A surface illuminant device according to claim 5, further comprising a flat light reflecting member disposed between said cover and a lower face of said light guide plate, said light reflecting member being omitted at a portion coinciding with said slit.

10. A surface illuminant device according to claim 2, wherein said receiving portion is a groove which opens only toward a lower face of said light guide plate.

11. A surface illuminant device according to claim 2, wherein said receiving portion is a notch which opens toward a lower face of said light guide plate and toward said side-end face of said light guide plate.

12. A surface illuminant device according to claim 1, wherein said receiving portion is at least partially positioned within an effective light emitting area of said light guide plate.

13. A flat-panel display device comprising
a tubular light source having both ends thereof respectively connected with power wirings,
a light guide plate having a light-introducing side-end face or side-end faces along which said tubular light source is disposed closely so that an incident light from said tubular light source is propagated in said light guide plate and is emitted from an upper face of said light guide plate, and the other side-end face(s) or edge(s) along which said tubular light source is not disposed,
a pull-around line which extends along said other side-end face(s) or edge(s) and is included in at least one of said power wirings, and
a display panel which is disposed above said light guide plate,
further comprising a groove-like or notch-like receiving portion, formed in said light guide plate, which extends continuously along said other side-end face(s) or edge(s) and which at least partially accommodates said pull-around line.

\* \* \* \* \*